United States Patent [19]
Canat et al.

[11] Patent Number: 5,263,072
[45] Date of Patent: Nov. 16, 1993

[54] THERMOHYDRAULIC GRID AND NUCLEAR FUEL ASSEMBLY

[75] Inventors: Jean-Nöel Canat, Lyon; Bernard Petit, St Genis Laval, both of France

[73] Assignee: Framatome and Compagnie Generale des Matieres Nucleaires, France

[21] Appl. No.: 890,777

[22] Filed: Jun. 1, 1992

[30] Foreign Application Priority Data

May 30, 1991 [FR] France ............... 91 06524

[51] Int. Cl.⁵ .............................................. G21C 3/34
[52] U.S. Cl. .................................. 376/439; 376/438; 376/441
[58] Field of Search ............... 376/439, 443, 438, 442, 376/462, 441, 449; 976/DIG. 60, DIG. 78, DIG. 75

[56] References Cited

U.S. PATENT DOCUMENTS

| | | | |
|---|---|---|---|
| 4,120,751 | 10/1978 | Bezold | 376/441 |
| 4,155,807 | 5/1979 | Schreiber et al. | 376/438 |
| 4,325,786 | 4/1982 | Wohlsen | 376/442 |
| 4,576,786 | 3/1986 | De Mario et al. | 376/439 |
| 4,692,302 | 9/1987 | De Mario et al. | 376/439 |
| 4,726,926 | 2/1988 | Patterson et al. | 376/439 |
| 4,759,892 | 7/1988 | Lemercier | 376/290 |
| 4,827,063 | 5/1989 | Bökers et al. | 376/439 |
| 4,988,474 | 6/1991 | Hoffmann et al. | 376/261 |

FOREIGN PATENT DOCUMENTS 0148452 7/1985 European Pat. Off. .
2517868 6/1983 France .
2021303 11/1979 United Kingdom .

Primary Examiner—Donald P. Walsh
Assistant Examiner—Meena Chelliah
Attorney, Agent, or Firm—Pollock, Vande Sande & Priddy

[57] ABSTRACT

The grid comprises two sets of straps intersecting and fixed at their points of intersection, delimiting cells designed to be crossed some by thimble guides and the others by fuel rods, fitted with mixing vanes. It is provided with a surround carrying guide vanes, connected to at least some of the thimble guides. It is suitable for use in fuel assemblies for pressurized water reactors.

11 Claims, 3 Drawing Sheets

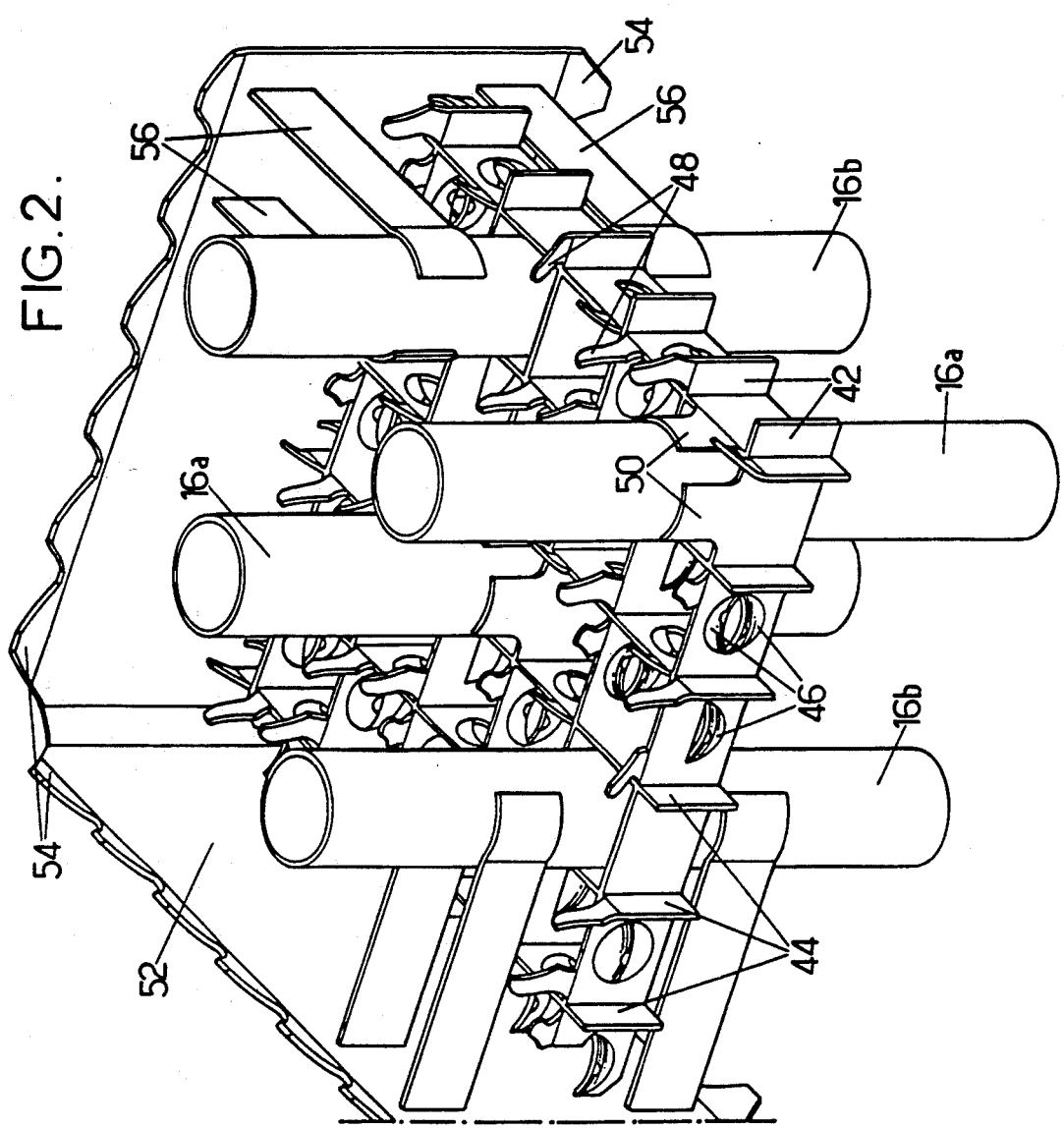
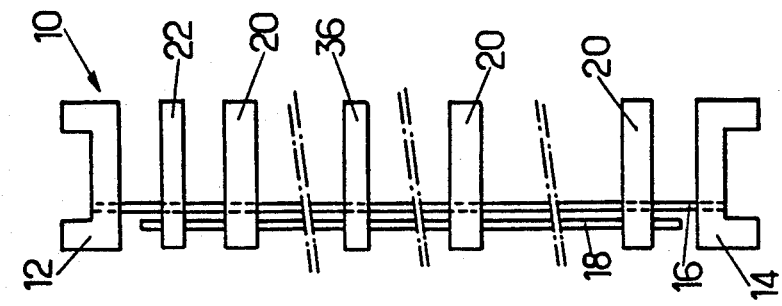

THERMOHYDRAULIC GRID AND NUCLEAR FUEL ASSEMBLY

BACKGROUND OF THE INVENTION

The present invention concerns a thermohydraulic mixing grid for nuclear fuel assembly, this grid being designed to improve the mixing of the streams of coolant circulating in the assembly and to homogenize the temperatures, and being intended to be inserted between grids which are the structural components of the assembly.

The invention finds a particularly important application in fuel assemblies for pressurized water reactors comprising a support structure having two nozzles connected by thimble guides and having fuel rod positioning grids distributed along the assembly, each positioning grid having at least two sets of intersecting straps and an outer surround delimiting the cells crossed some by the thimble guides and others by the rods, the straps being provided with means for supporting the rods at the nodes of a regular lattice and being fixed to at least some of the thimble guides, some grids at least (those placed downstream in the flow direction) being provided with mixing vanes for the coolant streams.

At least one of the positioning grids also supports the fuel rods. To do so, it is normally fitted with springs, cut out of the straps or added on to the straps, designed to force the rods against dimples stamped in the straps forming the sides of the cell.

The other positioning grids only perform a function of centering the rods at the nodes of the lattice. To do so, they comprise rod support dimples on each side of each cell crossed by a rod.

To increase heat exchange between the rods and the coolant, and to homogenize the temperatures at each level, it has already been proposed to insert an additional mixing grid, in one or more of the intervals between two positioning grids.

In particular, mixing grids have been proposed with low internal straps, fitted with vanes, having a surround. The surround must then consist of outer straps which are thick and/or higher than the inner straps, increasing the neutron absorption and head losses. The surround must be sufficiently strong to avoid being deformed when two grids of two adjacent fuel assemblies collide or in the case of earthquake.

An attempt was made to circumvent the problem (EP-A-Q 261 544) by using additional grids devoid of surrounds, consisting of flat straps, fixed to the thimble guides and delimiting cells with dimensions such that the rods pass through them with a clearance.

Such intermediate grids present drawbacks. They do not participate in positioning the rods. The peripheral channels do not have means for mixing the liquid streams, and are cooled less than the internal channels, incurring the risk of overheating.

SUMMARY OF THE INVENTION

It is an object of the present invention in particular to provide a thermohydraulic grid meeting the practical requirements better than those of the prior art, particularly in that it achieves uniform mixing without presenting the drawbacks of the previous additional grids with a surround, of which the surround is reinforced to withstand impact.

To achieve this, the invention provides a thermohydraulic grid having at least two sets of mutually intersecting straps fixed at their points of intersection, generally by welding or by brazing, defining cells intended to be crossed some by thimble guides and others by fuel rods, fitted with mixing vanes, characterized in that it is provided with a surround carrying guide vanes, surrounding the straps and independent of the straps, connected at least to some of the thimble guides.

The guide vanes, which are necessary in practice to facilitate the insertion and removal of the fuel assemblies, ensure a mixing that compensates for the absence of mixing vanes in the peripheral channels. A sufficient clearance can be provided, between the straps and the thimble guides connected to the surround, to allow some free movement between the sets of straps and the surround, such that an impact causing failure of the surround does not damage the straps and has no effect on the geometry of the rod lattice arrangement.

The surround can consequently be of low height, about 1 cm for example, and/or consist of metal sheet of the same thickness as the straps, thinner than in the structural grids.

Each strap can be provided with dimples projecting from each of the sides of the inner cells to limit the movement of the rods, and can have a length such that the plan view footprint of the grid is smaller than that of the virtual envelope of the rods.

The additional grids are generally made of a zirconium base alloy, hence with low neutron absorption, such as one of those known by the name 'Zircaloy'.

The invention also proposes a fuel assembly of which the structure comprises, in addition to end nozzles, to thimble guides for connecting the nozzles and to rod supporting and positioning grids having a surround, at least one additional grid placed between two support grids, of the type described above.

The invention will be better understood from reading the following description of the particular embodiment of the invention, given as a non-limitative example. The description refers to the accompanying drawings.

BRIEF DESCRIPTION OF THE DRAWINGS

FIG. 1 is a schematic elevation view showing a distribution of the grids in a fuel assembly for pressurized water reactor.

FIG. 2 is a perspective view showing a fragment of a thermohydraulic mixing and positioning grid according to a particular embodiment of the invention.

DETAILED DESCRIPTION OF PREFERRED EMBODIMENTS

Figure 3:
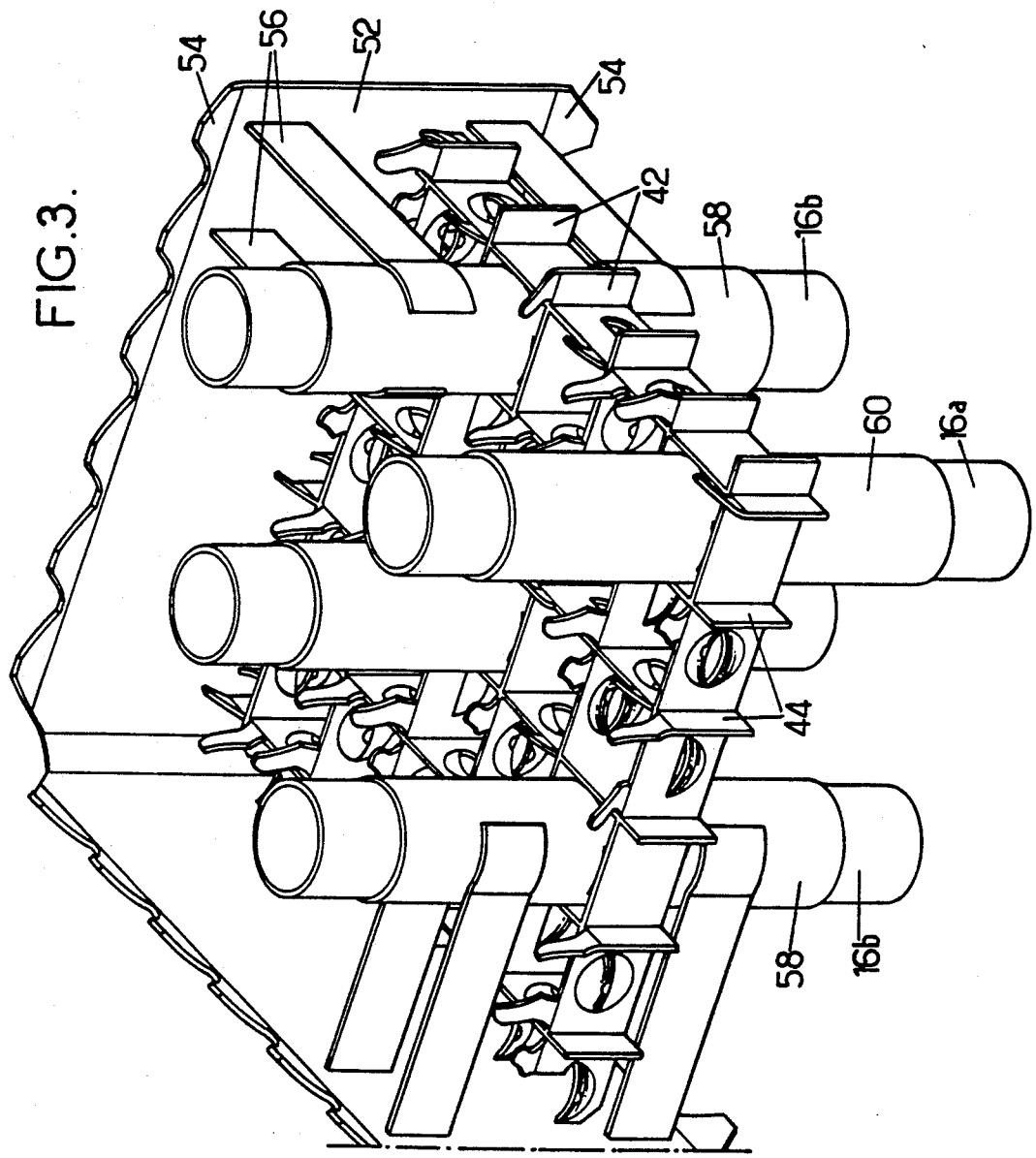
FIGS. 3 and 4, similar to FIG. 2, show modified embodiments.

A grid according to the invention is used in particular in a fuel assembly 10 of the type shown in FIG. 1. Assembly 10 has a structure with two end nozzles 12 and 14 connected by thimble guides 16 designed to receive the rods of a control rod cluster, not shown. Fuel rod positioning grids 18, of which only one is shown, are distributed at intervals along the thimble guides and are fixed to at least some of the thimble guides 16.

Among the grids, some, designated by the reference 20, may only perform a function of positioning and centering the rods 18 at the nodes of a lattice, generally square. They generally consist of two intersecting sets of straps in which rod bearing pads are provided. The grids 20, or at least those which are located furthest downstream in the flow direction (normally upflow), may be provided with vanes for generating turbulence or crossflow. The rods can be supported longitudinally by a single grid 22, provided for the purpose with springs to force the rods against dimples, cut out of the straps or added on.

An assembly of the type shown in FIG. 1 is already known, in which the positioning grids 20 are of zirconium base alloy and the single rod support grid 22 is of a high-strength alloy, such as Inconel.

Figure 4:
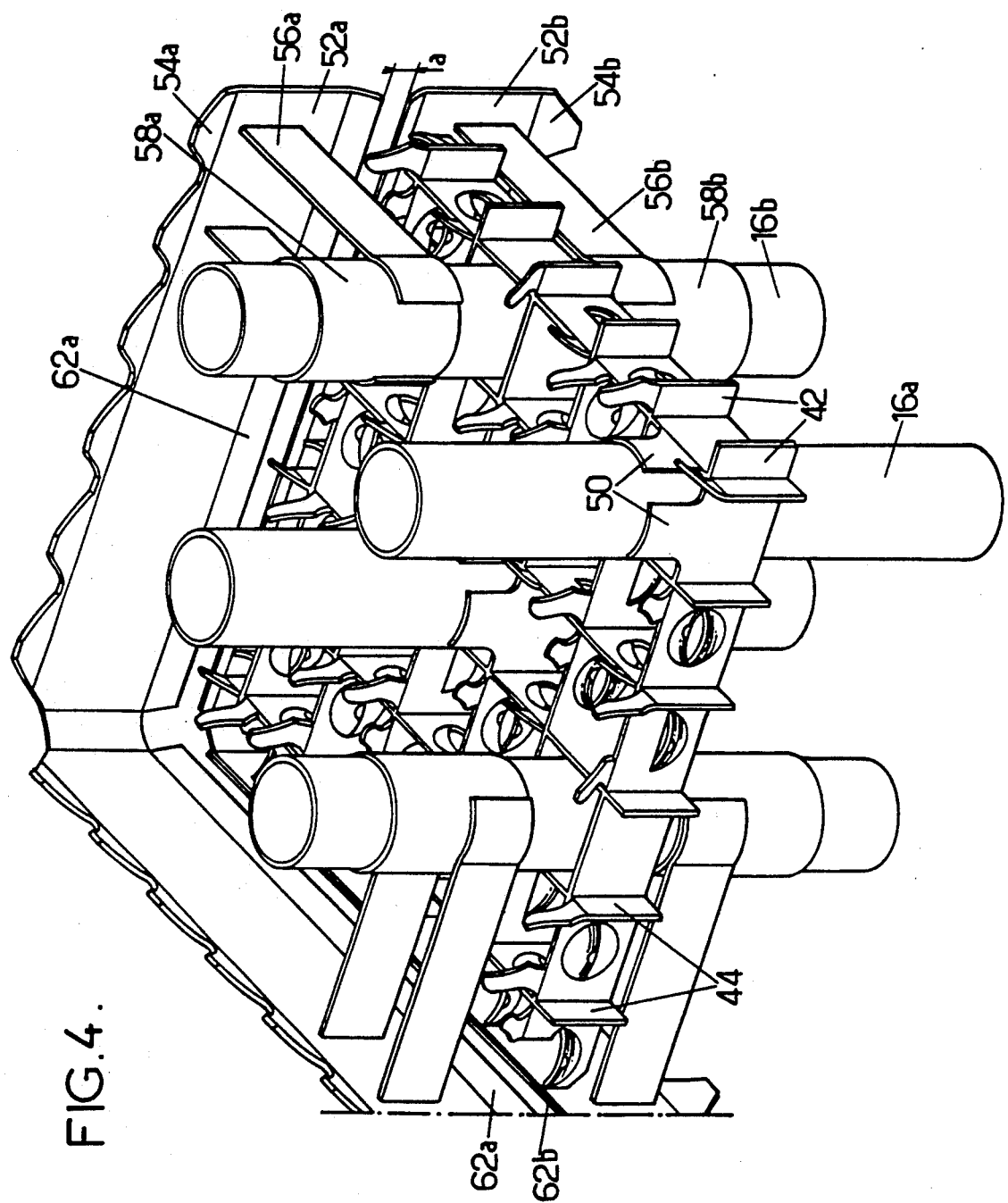

At least in the downstream part of an assembly according to the invention, two successive positioning grids 20 are separated by an additional thermohydraulic grid 36 provided with mixing vanes 48 and, in particular, possibly having one of the constructions shown in FIGS. 2, 3 and 4. The additional grid comprises two sets of intersecting straps 42 and 44 provided with pads 46. The pads 46 shown as examples consist of stamped bosses in the form of half-caps projecting in each of the cells designed to receive a fuel rod. These pads prevent the fuel rods from coming into contact with the mixing vanes 48. The amount of projection of the pads with respect to the standard portion of the straps may be such that they allow a diametral clearance to subsist, enabling the fuel rods 18 to slide freely. Two adjacent dimples may be formed by making a slit along the median line of the strap and by deforming the strap in opposite directions above and below the slit.

The length of the straps may be such that the plan view dimensions of the intersection are inscribed within the virtual envelope of the bundle of rods 18.

The straps are fixed to each other, by welding for example, at their points of intersection. They can be of thin metal sheet, about 0.5 mm thick for example, joined by mutual engagement of slits.

The mutually-crossing straps of the grid in FIG. 2 are fixed to some of the thimble guides 16a. For the purpose, the downstream edge of the straps surrounding these thimble guides is prolonged, around the cells intended for the passage of the thimble guides 16a, by tabs 50 designed to be welded, for example by resistance welding, to these thimble guides.

The grid comprises a surround 52 which passes round the set of straps allowing a radial clearance to subsist, around the envelope of the fuel rods. The height of the surround shown as an example in FIG. 2 is greater than that of the straps. However, the neutron absorption of this surround may be low, because, since it is independent of the set, it may be made of a thin material, such as a strip having the same thickness as that of the straps. The upstream and downstream edges of the surround 52 are fitted with guide vanes 54 designed to prevent mutual hooking of two grids during the insertion or removal of an assembly. These guide vanes 54, being inclined inward, also cause mixing of the coolant streams, preventing subcooling of the border fuel rods. The surround is fixed to some of the thimble guides, generally to the thimble guides placed nearest to the surround. In the case shown in FIG. 2, the surround is fixed to those thimble guides 16b which are not connected to the intersection of the straps. Means for attachment are advantageously provided on both sides of the intersection in the vertical direction. In the case shown in FIG. 2, the surround is fixed to each of the thimble guides 16b by two pairs of brackets 56 placed one above and one below the intersection. These brackets 56 may be made of sheet of zirconium base alloy of the same thickness as the surround 52. They may be fixed to the surround by engagement of tenons which they carry in slots made in the surround and by welding. The brackets may be welded to the thimble guides 16b by resistance welding.

In practice, the set of straps 42 and 44 can be fixed to about half of the thimble guides, and the peripheral surround 52 can be fixed to the other half of the thimble guides. Thanks to the use of brackets at some distance from each other in the lengthwise direction, the parallelism of the walls of the surround 52 and of the thimble guides 16b can be firmly maintained.

In the embodiment shown in FIG. 3 (where the components corresponding to those in FIG. 2 are designated by the same reference numbers), the surround 52 is not fixed directly to the thimble guides 16b. The brackets 56 belonging to two superimposed pairs are fixed, for example by welding, to a sleeve 58 placed around a thimble guide 16b. The straps 42 and 44 do not comprise tabs. They are slipped on or fixed to the sleeves 60 similar to the sleeves 58. The sleeves 58 and 60 can be designed to have a sliding fit on the respective guide tubes. It is possible to provide sleeves only on the thimble guides which are connected to brackets.

The embodiment shown in FIG. 4 comprises two half-surrounds 52a and 52b, of symmetrical construction, each placed on one side of the set of straps in the lengthwise direction. The surround 52a is fitted, on its downstream edge, with guide vanes 54a. Its upstream edge is simply bent to make an inclined plane 62a eliminating the risks of hooking. This half-surround 52a is connected, in the embodiment shown, to short sleeves 58a slipped on the thimble guides 16b. In this case, the brackets 56a for attaching a half-surround are all at the same level, which presents no serious drawback given the small dimensions of the half-grids in the lengthwise direction. The spacing a between the half-grids is generally smaller than the dimension of the intersection in the lengthwise direction.

The arrangements described above can be combined and, in particular, it is possible to fix the set to thimble guides which also carry the surround, although this solution is generally less favorable, because it reduces the independence between the surround and the set.

The grids according to the invention can be made and mounted in various ways.

Grids of the type shown in FIG. 2 can be made by fabricating separately set/surround assemblies which are welded to the respective thimble guides during the fabrication of the skeleton.

In the case in FIG. 3, the grids form subassemblies independent of the skeleton, which can be positioned by making them slide on the thimble guides 16a and 16b before welding the sleeves 58 and 60 to the respective thimble guides by resistance welding or by deformation welding.

In the case shown in FIG. 4, it is possible to mount successive grids during the fabrication of the skeleton by successively positioning and welding one of the half-surrounds fitted with its sleeves, followed by the set, and then the second half-surround.

The invention is not limited to the particular embodiments shown, and described as examples, and it must be understood that it extends to any other variant remaining within the scope of equivalents.

We claim:

1. Thermohydraulic mixing grid for a nuclear fuel assembly, comprising: at least two mutually intersecting sets of mutually parallel straps fixed at their points of intersection, defining cells some for receiving thimble guides and others for receiving fuel rods, provided with mixing vanes; and a surround carrying guide vanes, mechanically connected to at least some of the thimble guides, and devoid of direct connection with said straps.

2. Grid as claimed in claim 1, wherein said straps have a length such that the grid has a footprint smaller than a virtual envelope of the fuel rods.

3. Grid as claimed in claim 1, wherein said surround has such a size that a radial clearance exists between a virtual envelope of the fuel rods and said surround.

4. Grid as claimed in claim 1, further comprising brackets securely fastened to the surround for fixing said surround to respective ones of said thimble guides, placed on both sides of the intersecting straps and at a distance thereof in the lengthwise direction.

5. Grid as claimed in claim 1, wherein said intersecting straps are fixed to only some of said thimble guides while the surround is fixed to other ones of said thimble guides.

6. Grid as claimed in claim 1, wherein said surround has a lengthwise development direction greater than the lengthwise thickness of the intersecting sets of straps.

7. Grid as claimed in claim 1, wherein said surround is fixed to respective ones of said thimble guides by welded brackets and by sleeves slipped on said thimble guides.

8. Grid as claimed in claim 1, wherein said surround is divided into two half-surrounds straddling the sets of straps in the lengthwise direction and each connected two respective ones of said thimble guides or to sleeves by brackets placed on a single side of the sets.

9. Grid as claimed in claim 8, wherein said half-surround comprises a bend on the side directed towards the other half-surround, and guide and mixing vanes on the opposite side.

10. A nuclear fuel assembly having:
a bundle of mutually parallel fuel rods, and a support structure including:
end nozzles,
a plurality of thimble guides connecting the nozzles,
a plurality of fuel rod positioning grids distributed between the end nozzles, and
at least one thermohydraulic grid placed between two of said fuel rod positioning grids,
wherein said thermohydraulic grid comprises:
at least two mutually intersecting sets of mutually parallel straps fixed at their points of intersection, defining cells some for receiving said thimble guides and others for receiving said fuel rods, said straps being provided with mixing vanes; and a surround carrying guide vanes, mechanically connected to at least some of the thimble guides and devoid of direct connection with said straps.

11. A nuclear fuel assembly having:
a bundle of fuel rods parallel to a longitudinal direction and a support structure including:
end nozzles,
a plurality of thimble guides connecting the end nozzles,
a plurality of fuel rod positioning grids distributed between the end nozzles, and
at least one thermohydraulic grid placed between two of said fuel rod positioning grids,
wherein said thermohydraulic grid comprises:
at least two mutually intersecting sets of mutually parallel straps fixed at their points of intersection, defining cells some for receiving said thimble guides and others for receiving said fuel rods, said straps being provided with mixing vanes and said cells leaving a diametral clearance to said fuel rods; and a surround formed with guide vanes, rigidly connected to at least some of the thimble guides by brackets longitudinally offset with respect to said straps, said surround being devoid of direct connection with said straps.

* * * * *